US012373264B2

(12) United States Patent
Sevilla Cedillo et al.

(10) Patent No.: US 12,373,264 B2
(45) Date of Patent: Jul. 29, 2025

(54) WORKLOAD DATA TRANSFER SYSTEM AND METHOD

(71) Applicant: Advanced Micro Devices, Inc., Santa Clara, CA (US)

(72) Inventors: Jorge Sevilla Cedillo, Extremadura (ES); Ian Ferreira, Issaquah, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 681 days.

(21) Appl. No.: 17/737,463

(22) Filed: May 5, 2022

(65) Prior Publication Data

US 2022/0357999 A1   Nov. 10, 2022

Related U.S. Application Data

(60) Provisional application No. 63/186,044, filed on May 7, 2021.

(51) Int. Cl.
*G06F 9/50* (2006.01)
(52) U.S. Cl.
CPC .................................. *G06F 9/5088* (2013.01)

(58) Field of Classification Search
CPC . G06F 9/5088; G06F 2209/509; G06F 9/5027
See application file for complete search history.

(56) References Cited

U.S. PATENT DOCUMENTS

| | | | |
|---|---|---|---|
| 2017/0004018 A1* | 1/2017 | Mangtani | G06F 9/5038 |
| 2020/0358774 A1* | 11/2020 | Dearment | G06F 9/468 |
| 2020/0389355 A1* | 12/2020 | Araujo | H04L 63/20 |
| 2021/0058388 A1* | 2/2021 | Knotwell | G06F 9/45558 |
| 2021/0144517 A1* | 5/2021 | Guim Bernat | H04L 47/781 |
| 2022/0038544 A1* | 2/2022 | Grinstein | H04L 63/0853 |

* cited by examiner

*Primary Examiner* — Brian W Wathen
(74) *Attorney, Agent, or Firm* — Fishman Stewart PLLC

(57) ABSTRACT

A system including a management application and a satellite container. The management application is configured to manage workload operations of a customer computer cluster and a plurality of third-party compute systems. The satellite container and a customer computer cluster are on a customer network. Further, the satellite container is configured to: provide configuration data of the local computer cluster and authorization data to the management application; provide a first data request to the management application; receive workload data from the management application in response to the first data request; and convey the workload data from the satellite to the local computer cluster. The management application is outside the customer network.

20 Claims, 3 Drawing Sheets

WORKLOAD DATA TRANSFER SYSTEM AND METHOD

CROSS-REFERENCE TO RELATED APPLICATION

This application claims the benefit of and priority to U.S. Provisional Patent Application Ser. No. 63/186,044, filed on May 7, 2021, the disclosure of which is hereby incorporated by reference in its entirety as though fully set forth herein.

TECHNICAL FIELD

The present disclosure generally relates to workload data transfer to and from local compute systems.

SUMMARY

Systems and methods are presented herein that provide a secure communication channel to transfer workload data among a local compute system and one or more third-party compute systems.

The system may, for example, include a satellite container on a local network. The satellite container is configured to automatically initiate communications between a local compute system and a management application outside the local network.

According to an example, a system includes a management application configured to manage workload operations of a customer computer cluster and a plurality of third-party compute system. The system also includes a satellite container on a customer network along with the customer computer cluster. The satellite container is configured to: provide configuration data of the customer computer cluster and authorization data to the management application; provide a first data request to the management application after the management application determines that the satellite container is authorized to communicate with the management application and that the customer computer cluster is properly configured; receive workload data from the management application in response to the first data request; and convey the workload data from the satellite to the local computer cluster.

According to another example, a method includes at least: providing, via a satellite container, authorization data and local computer cluster configuration data to a management application outside a local network, where the satellite application container is on the local network and the management application is configured to manage workload operations of a local computer cluster on the local network and a plurality of third-party compute systems. The method also includes verifying or validating, at the management application, that the satellite container is authorized to communicate with the management application and that the local cluster is properly configured, where the verification is based at least in part on the authorization data and the local computer cluster configuration data. Further, the method includes providing a first data request from the satellite container to the management application after verifying that the satellite container is authorized to communicate with the management application and that the local cluster is properly configured; receiving workload data at the satellite from the management application in response to the first data request; and conveying the workload data from the satellite to the local computer cluster.

According to another example, a system includes a management application and a satellite container. The management application originates from a first geographic location and is configured to manage workload operations of a customer computer cluster and a plurality of third-party compute systems. The customer computer cluster is on a customer network and is located at a second geographic location distal than the first geographic location. The management application is configured to: provide a customer the satellite container to install on a customer network. The satellite container is configured to: provide configuration data of the local computer cluster and authorization data to the management application; provide a first data request to the management application after the management application verifies that the satellite container is authorized to communicate with the management application and that the customer computer cluster is properly configured; receive workload data from the management application in response to the first data request; and convey the workload data to the customer computer cluster to manage the customer computer cluster.

Other examples are also presented herein.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Users often employ compute systems (e.g., public or private cloud computing services such as Amazon Web Services, Azure, or Kubernetes and/or bare metal computing systems) to carry out workloads. Further, for performance and/or cost reasons, a user may employ more than one of these compute systems. For example, one compute system may be chosen for certain workloads, while another compute system may be chosen for different workloads based on performance and/or cost metrics. Further, since costs can fluctuate, a user may alternate between different compute systems to save money.

Service platforms (e.g., a software as a service platform) have arisen to manage, as a service, communication between users and third-party compute systems. For example, a user may rely on a service platform to manage communications between more than one cloud provider to carry out a variety of workloads. Many publicly available platforms include the infrastructure that provide users access to the third-party compute systems. Often, however, a user may also employ a local or private compute system along with other third-party compute systems to carry out projects. For example, the local or private compute system may be employed to feed one or more third-party compute systems. Alternatively, or in addition, a user may employ one or more third-party compute system to feed a local or other private compute system. Since a local compute system is being employed, it is generally important to maintain a firewall to monitor and filter traffic in and out of the local compute system based on the user's or organization's security policies.

A firewall, however, may make it difficult to seamlessly communicate between a local cluster and other third-party provider(s). Further, while a firewall may be employed to block or allow access, a virtual private network (VPN) may be needed to ensure incoming and outgoing traffic remains private an/or anonymized. A VPN, however, may add complexities a user is not interested in managing. Time, costs, certificate management, and data access management related to VPNs are just a few areas that can pose difficulties for a user. For example, when communicating with a service platform, a VPN may provide broader access to the user's compute system or network than the user is conformable with allowing.

For at least these reasons, there is a desire for an improved system and method for efficiently managing communications between a user's compute system (e.g., local cluster) and other third-party compute systems. The foregoing discussion is intended only to illustrate examples of the present field and is not a disavowal of scope.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
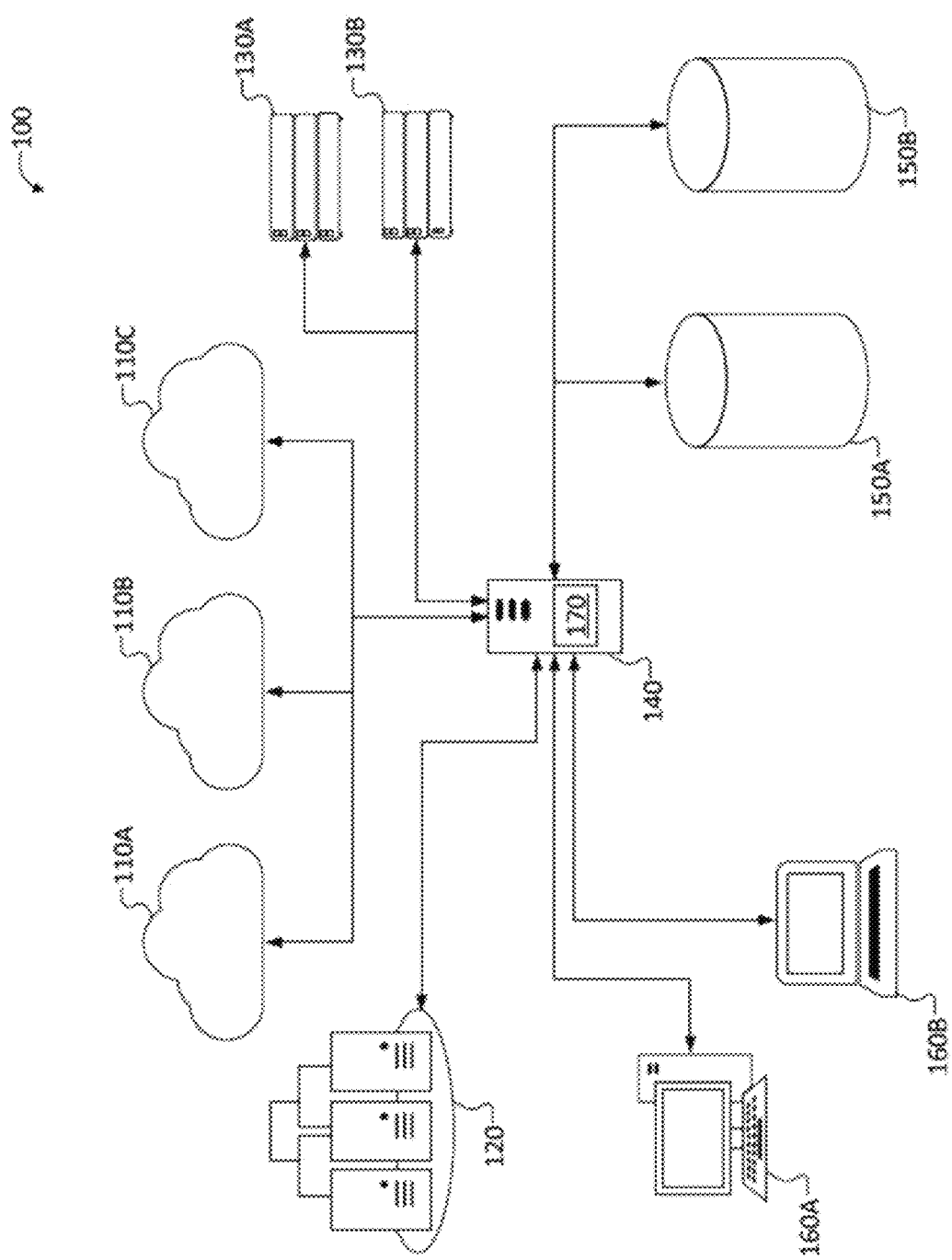
FIG. 1 is a schematic view generally illustrating an example embodiment of a distributed computing system according to teachings of the present disclosure.

Turning now to FIG. 1, an example of a distributed computing system 100 according to teachings of the present disclosure is shown. In this example, the exemplary distributed computing system 100 is managed by an exemplary management server 140, which may for example provide access to the distributed computing system 100 by providing a platform as a service (PAAS), infrastructure as a service (IAAS), or software as a service (SAAS) to users. Users may access these PAAS/IAAS/SAAS services from their on-premises network-connected PCs, workstations, or servers (160A) and laptop or mobile devices (160B) via a web interface.

Management server 140 is connected to a number of different compute systems and/or devices via local or wide area network connections. This may include, for example, cloud computing providers 110A, 110B, and 110C. These cloud computing providers may provide access to large numbers of computing devices (often virtualized) with different configurations. For example, systems with one or more virtual CPUs may be offered in standard configurations with predetermined amounts of accompanying memory and storage. In addition to cloud computing providers 110A, 110B, and 110C, management server 140 may also be configured to communicate with compute systems such as bare metal computing devices 130A and 130B (e.g., non-virtualized servers), as well as a datacenter 120 including for example one or more supercomputers or high-performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run an exemplary distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages. The program code may execute entirely on the server 140, partly on server 140 and partly on other computing devices in distributed computing system 100.

The management application 170 may be configured to provide an interface to users (e.g., via a web application, portal, API server or command line interface) that permits users and administrators to submit applications/jobs via their workstations 160A and laptop or mobile devices 160B, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, one or more nodes within a cluster (e.g., running with a virtual machine or container). Management server 140 may be configured with one or more processors (physical or virtual), volatile memory, and non-volatile memory such as flash storage or internal or external hard disk (e.g., network attached storage accessible to server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one example, the jobs may be configured to run within containers (e.g., Kubernetes with Docker containers, or Singularity) or virtualized machines on the distributed computing system 100. Kubernetes is an open-source system for automating deployment, scaling, and management of containerized applications. Singularity is a container platform popular for high performance workloads such as artificial intelligence and machine learning.

Figure 2:
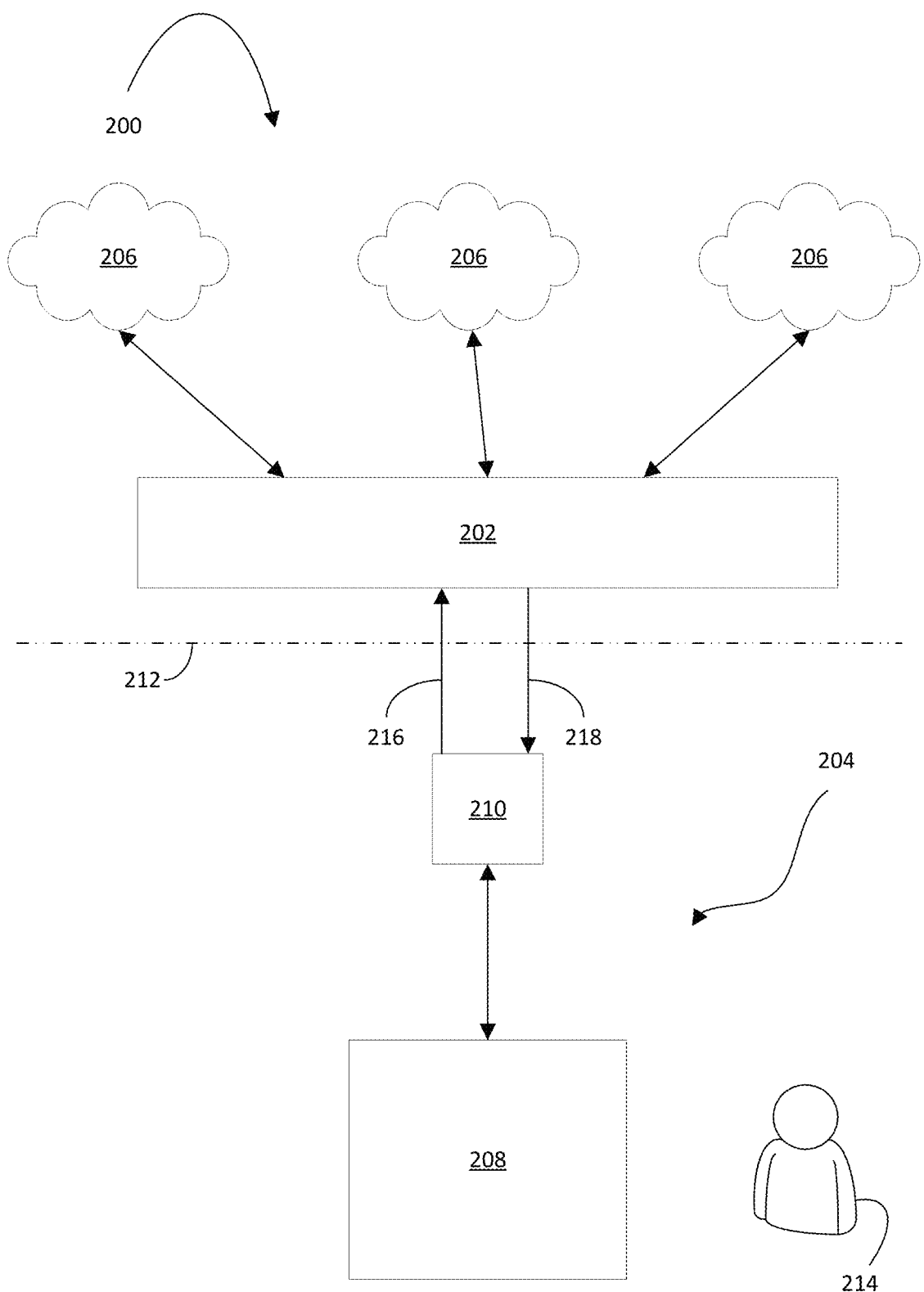
FIG. 2 is a schematic view generally illustrating another exemplary distributed computing system according to teachings of the present disclosure.

Turning now to FIG. 2, a schematic view of another exemplary distributed computing system 200 is shown. The exemplary distributed computing system 200 includes an exemplary distributed computing management application 202 (see, e.g., the application 170 of FIG. 1), an exemplary local network 204, and one or more third-party compute systems 206. While three third-party compute systems 206 are represented in FIG. 2, other examples may include one, two, or more than three third-party compute systems. The third-party compute systems 206 may, for example, include cloud compute systems, datacenters, and/or bare metal compute systems.

The distributed computing management application 202 (a.k.a. the management application), the local network 204, and each of the third-party compute systems 206 may each be at distinct geographic locations.

With continued reference to FIG. 2, operating on the local network 204 is a local and/or private compute system 208 (e.g., a local computer cluster such as a local Kubernetes cluster) and a data satellite 210 (a.k.a., satellite container or docker satellite container). Further, the local network 204 may also include a firewall 212 that manages access to the local network 204. While FIG. 2 represents the local compute system 208, the satellite 210, and the firewall 212 operating on or with the local network 204, other examples may include additional features not shown. For example, other exemplary local networks may include additional features such as workstations, other local clusters, one or more data storage devices, one or more servers, and/or etc.

Regardless of the features of the local network 204, the management application 202 manages communications to and from the third-party compute systems 206 and the satellite 210 manages data transfer between the local compute system 208 and the management application 202. Due at least in part to the manner in which the satellite 210 operates, the local network is not accessible to the management application 202. As such, the local network 204 remains secure.

There may be a variety of reasons why a customer (e.g., customer 214) may want to employ both a local compute system (e.g., local compute system 208) and one or more third-party compute systems (e.g., one or more of the third-party compute systems 206). For example, the customer may engage in a project where small scale business and/or scientific modeling is carried out on their local compute system. The results (workload data or communications) of the modeling along with other workload data (e.g., workload commands provided by the management application) may then be provided, via a management application (e.g., management application 202), to one or more third-party compute systems having resources beyond the local compute system. As such, the one or more third-party compute systems may employ the supplied workload data and commands to carry out more extensive workload(s). The results of these more extensive workloads may then be provided back to the customer. In addition to the example discussed above, or in the alternative, there may be other reasons such as costs and/or efficiencies as to why a customer may want workload data from the local compute system to be shared with one or more third-party compute systems or vice versa.

With reference back to FIG. 2, the satellite 210 creates a secure data channel so that data may be passed from the local compute system 208 to the management application 202, before being provided to the one or more third-party compute systems 206. Further details regarding the satellite 210 are provided below.

Initially, the management application 202 may provide the satellite 210 to the local network 204. The management application 202 may also provide the user 214 with a set of instructions that instruct the user how to configure the local compute system to operate with the satellite 210. The user 214 may then configure the local compute system 208 to operate with the satellite 210. To ensure the local compute system 208 is properly configured to operate with the satellite 210, the satellite 210 may be configured to execute a script (e.g., a pre-flight script) that engages or tests the local compute system 208. As such, the satellite may carry out a plurality of tests to determine or verify that the local compute system 208 meets requirements of the management application 202. In other words, the satellite validates that the cluster is properly configured.

Further validations or tests may also be carried out to determine or verify if the local compute system 208 is properly configured to operate with the management application 202. For example, the satellite 210 may provide 216 metadata (e.g., authorization data and local compute system configuration data) to the management application 202. Based on the provided metadata, the management application 202 may determine or verify if the local compute system 208 is properly configured. If configured properly, the management application 202 may indicate 218 to the satellite 210 that the local compute system 208 is properly configured.

Alternatively, based on the configuration information provided from the satellite 210, the management application 202 may determine that the local compute system 208 is not configured properly. As such, the management application 202 may provide 218 an error report or the like to the satellite 210. The user 214 may then use the error report to correct configuration or other errors.

The satellite 210 of the local network 204 has a container structure (e.g., a Docker container). A container is a data structure that allows an application to be deployed on a variety of computing environments generally quickly and reliably. The container (satellite 210) may, for example, include support kubernetes, slurm, and/or other management frameworks. Since the satellite 210 is configured as a container, the satellite 210 is operational on a variety of operating systems. Further, the satellite 210 may be configured to operate in a variety of architecture environments such as, for example, ARM, AMD64, and X86. As such, a variety of users may effectively employ the satellite 210.

While the customer 214 may want to automatically and securely share workload data among the local compute system 208 and one or more of the third-party compute systems 206, the customer 214 may also want to ensure that other data on the local network 204 remains private. Accordingly, the satellite 210 automatically brokers information between the local compute system 208 and the management application 202 in a private, secure, and effective manner.

For example, rather than the local network 204 responding to unsolicited workload data requests, any transfer of workload information among the local compute system 208 and the management application begins with a first communication request (i.e., an inhiation request) provided 216 to the management application 202 by the satellite 210. The management application 202 then responds 218 to the initiation request with workload data that may include workload commands and/or workload results from the one or more third-party compute systems 206. Since communication begins with the initiation request 216 from the satellite 210, security issues are minimized. In other words, since communication begins with the initiation request 216 from the satellite 210, instead of responding to unsolicited requests that are initiated outside the local network 204, the potential threat footprint is minimized. To put yet another way, the satellite 210 need not determine if an unsolicited request outside the local network 204 is legitimate (e.g., whether or not an incoming unsolicited workload data request comes from a spoofed address), since the satellite 210 is not responding to unsolicited requests.

The response 218 from the management application 202 may include a variety of workload data. For example, the workload data may include workload commands from the management application 202 that are intended to be carried out by the local compute system 208. Further, the workload data may also include data associated with prior operations of the one or more third-party compute systems 206.

Regardless on the information provided 218 by the management application 202, the satellite 210 may automatically employ one or more additional techniques to ensure a secure communication channel between the compute system 208 and the management application 202 is operating properly. For example, the satellite 210 may employ hypertext transfer protocol secure (HTTPS) to ensure secure communications between the local compute system 208 and the management application 202. In such an example, hashing techniques may be employed that are based, at least in part, on the initiation request 216 and/or the response 218, to ensure secure communications. Similar techniques may also be employed to encrypt the workload data as it is provided from the local network 204 to the management application 202 and vice versa.

Since a protective feature such as the HTTPS may be relied upon to ensure secure communications, the user or customer 214 may avoid the overhead that comes with establishing a Virtual Private Network (VPN) to manage and protect communications between the local network 204 and the management application 202. Further, since the satellite 210 does not provide access to the entire local network 204 like a VPN may, the satellite 210 can be employed to only allow access to certain information (e.g., workload information from the local compute system 208).

After the satellite 210 initiates communication with the management application 202 and workload data is passed to the local compute system 208, the satellite provides responsive data from the local compute system 208 to the management application 202. The management application 202 may then pass the responsive data (e.g., additional workload data) and workload commands to one or more of the third-party compute systems 206. The one or more third-party compute systems may then employ the responsive data and commands to perform one or more additional workloads. Once performed, the one or more third-party compute systems 206 may pass along additional workload data back to the management application 202, which in turn may be passed to the local compute system 208 via the satellite 210 (i.e., after the satellite initiates an additional request). The workload data may be used by the compute system 208 to carry out additional workload(s).

The management application 202 manages workloads among the local compute system 208 and third-party systems 206. The satellite 210, however, brokers the information that the management application 202 may send to, or receive from, the local compute system 208 to ensure privacy of the local network 204. In other words, due to the manner in which the satellite 210 operates, it serves as a gatekeeper between the local network 204 and the management application 202 and, in turn, the third-party compute systems 206.

Figure 3:
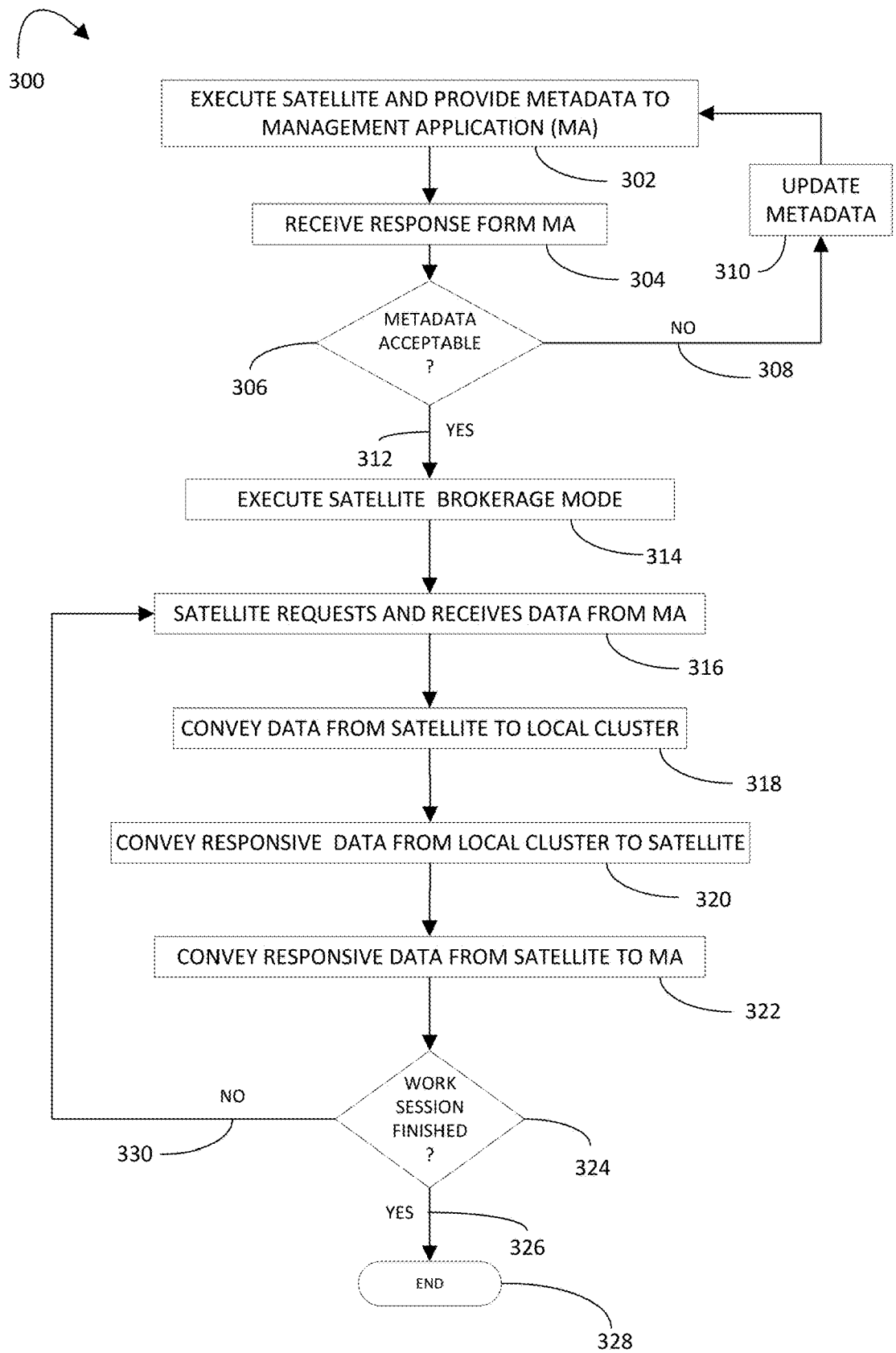
FIG. 3 is a flowchart representing an exemplary secure correspondence technique according to teachings of the present disclosure.

Turning now to FIG. 3, an exemplary technique 300 for secure correspondence between a local computer cluster (i.e., a compute system) on a local network and a management application outside the local network is shown. Technique 300 begins at block 302, where a satellite container (a.k.a. satellite) on the local network is executed and automatically provides metadata to a management application outside its local network. The metadata may include, for example, local cluster features (e.g., configuration data) and authentication data.

After the satellite provides the metadata to the management application, the satellite receives a response from the management application at block 304. The response from the management application indicates whether the metadata was acceptable. Acceptable metadata may indicate, for example, that the authorization data was acceptable and that the local cluster is properly configured. Unacceptable metadata may indicate that, for example, the authorization data and/or the local cluster configuration data is not acceptable.

At block 306, the satellite determines if the metadata previously provided to the management application was acceptable. If the metadata was not acceptable 308, process control proceeds to block 310 and the metadata is updated. The metadata may be directly or indirectly updated by a user. For example, a user may reconfigure the local cluster and/or update authorization information. Once the metadata is updated at block 310, process control proceeds back to block 302 where the updated metadata is sent to the management application.

If, on the other hand, it was determined at block 306 that the metadata was acceptable 312, process control proceeds to block 314 and a brokerage mode of the satellite is executed automatically. The satellite then requests (e.g., an initiation request or first data request) and receives data from the management application at block 316. The data (a.k.a. workload data) may be related to a variety of operations or commands that the local cluster is intended to execute. For example, the workload data may include a task from the management application to create one or more system volumes associated with one or more workloads. Additionally, the workload data may include prior workload results from a third-party cloud cluster that the local cluster intends to operate on. That is, the workload data may include results from one or more workloads previously carried out by one or more third-party compute systems Regardless of the form or type of workload data received at block 316, process control then proceeds to block 318 and the satellite conveys the workload data to the local cluster and the local cluster operates thereon. After the local cluster operates on or with the workload data, the local cluster conveys responsive workload data to the satellite at block 320 and the satellite then conveys the responsive workload data to the management application at block 322. While not shown in technique 300, the management application may then provide, after the local compute system workload is completed, the responsive workload data, or portions thereof, to one or more third-party compute systems with additional workload data. As discussed above, there are a variety of reasons such as costs, efficiencies, and/or compute metrics as to why a customer may want to provide local compute system data (e.g., local cluster data) to third-party compute system(s) or vice versa.

Referring back to the technique 300 of FIG. 3, at block 324 it is determined if the current work session has ended. If the current work session has ended 326, process control proceeds to block 328 and technique 300 comes to an END. Alternatively, if the work session has not ended 330, process control proceeds back to block 316, where additional workload data is requested from and received from the management application as technique 300 continues.

Accordingly, as seen in blocks 314-322, the satellite controls the flow of information (data) into 316 and out of 322 the local cluster or local network. As such, the satellite serves as an intermediary between the local compute system or cluster and the management application to ensure that workload data is provided to the proper recipient (the management application in this case).

The satellite is specialized and is configured to generally only access data from the local computer cluster that is intended for the management application and/or third-party compute systems. Accordingly, rather than the customer establishing a virtual private network (VPN) between the local compute system and the management application, where the VPN may have access to data from other parts of the local network, the satellite provides a lightweight secure communication channel for the customer that generally only has access to predetermined information (e.g., workload data presented from a local cluster). Further, the satellite may encrypt the workload data to ensure privacy as it is passed to the management application outside the local network. Accordingly, the manner in which the satellite is implemented minimizes the risk that data unrelated to project workloads is not inadvertently passed outside the local network.

Various examples and embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A system comprising:
   a management application configured to manage workload operations of a customer computer cluster and a plurality of third-party compute systems;

a satellite container on a customer network, wherein the customer computer cluster is also on the customer network, and wherein the satellite container is configured to:
provide configuration data of the customer computer cluster and authorization data to the management application;
provide a first data request to the management application after the management application determines that the satellite container is authorized to communicate with the management application and that the customer computer cluster is properly configured, wherein the determination is based on the authorization data and the configuration data;
receive workload data from the management application in response to the first data request; and
convey the workload data from the satellite container to the customer computer cluster.

2. The system of claim 1, wherein the satellite container is further configured to:
receive responsive workload data from the customer computer cluster, wherein the responsive workload data is based on the workload data conveyed from the satellite container, and wherein the satellite container is a Docker satellite container; and
convey the responsive workload data to the management application, wherein the responsive workload data received from the management application is based at least in part on workload operations of at least one of the third-party compute systems.

3. The system of claim 2, wherein the management application determines if the customer computer cluster is configured to operate with the management application based at least in part on the configuration data.

4. The system of claim 2, wherein the management application is further configured to provide the responsive workload data to at least one of the plurality of third-party compute systems to be employed for workload operations.

5. The system of claim 4, wherein the satellite container is further configured to:
provide a second data request to the management application without reauthorization of the satellite container; and
receive further workload data from the management application in response to the provided second data request, wherein the further workload data comprises data from at least one of the plurality of third-party compute systems and workload commands from the management application, and wherein the workload commands command the customer computer cluster to carry out workload operations.

6. The system of claim 5, wherein the management application is further configured to:
provide the satellite container to the customer network prior to authorization data and configuration data being provided to the management application; and
provide a user of the customer computer cluster a set of configuration instructions to configure the customer computer cluster to operate with the satellite container.

7. The system of claim 6, wherein the satellite container is further configured to execute a script to test operations of the satellite container prior to the authorization data and the configuration data being provided to the management application.

8. A method comprising:
providing, via a satellite container, authorization data and local computer cluster configuration data to a management application outside a local network, wherein the satellite container is on the local network, and wherein the management application is configured to manage workload operations of a plurality of third-party compute systems and a local computer cluster on the local network;
verifying, at the management application, that the satellite container is authorized to communicate with the management application and that the local computer cluster is properly configured, wherein the verification is based at least in part on the authorization data and the local computer cluster configuration data;
providing a first data request from the satellite container to the management application after verifying that the satellite container is authorized to communicate with the management application and that the local computer cluster is properly configured;
receiving workload data at the satellite container from the management application in response to the first data request; and
conveying the workload data from the satellite container to the local computer cluster.

9. The method of claim 8, further comprising:
conveying responsive workload data from the local computer cluster to the satellite container, wherein the responsive workload data is based at least in part on the workload data; and
conveying the responsive workload data from the satellite container to the management application, wherein the responsive workload data received from the management application is based at least in part on workload operations of at least one of the plurality of third-party compute systems.

10. The method of claim 9, further comprising providing a second data request from the satellite container to the management application without reauthorizing the satellite container.

11. The method of claim 10, further comprising providing, via the management application, the satellite container to the local network prior to providing the authorization data and the local computer cluster configuration data to the management application.

12. The method of claim 11, further comprising providing a user of the local computer cluster a set of configuration instructions to configure the local computer cluster to operate with the satellite container.

13. The method of claim 11, further comprising executing a script, via the satellite container, on the local computer cluster to test operations of the satellite container prior to providing the authorization data and the local cluster configuration data to the management application.

14. The method of claim 8, wherein the satellite container is a Docker satellite container.

15. A system comprising:
a management application at a first geographic location and configured to manage workload operations of a customer computer cluster and a plurality of third-party compute systems, where in the customer computer cluster is at a second geographic location distal than the first geographic location, the management application further configured to:
provide a customer a satellite container to install on a customer network, and
manage operations of the customer computer cluster that is on the customer network; and
the satellite container on the customer network is configured to:

provide configuration data of the customer computer cluster and authorization data to the management application;

provide a first data request to the management application after the management application verifies that the satellite container is authorized to communicate with the management application and that the customer computer cluster is properly configured, wherein the verification is based on the authorization data and the configuration data;

receive workload data from the management application in response to the first data request; and convey the workload data to the customer computer cluster to manage the customer computer cluster.

16. The system of claim 15, wherein the satellite container is a docker satellite container and is further configured to:

receive responsive workload data from the customer computer cluster after the customer computer cluster operates on the workload data; and convey the responsive workload data to the management application, wherein the responsive workload data received from the management application is based at least in part on workload operations of at least one of the plurality of third-party compute systems.

17. The system of claim 16, wherein the management application is further configured to provide the responsive workload data to at least one of the plurality of third-party compute systems to operate thereon.

18. The system of claim 17, wherein the satellite container is further configured to provide a second data request to the management application without reauthorization of the satellite container by the management application, wherein the workload data comprises workload commands from the management application, and wherein the workload commands command the customer computer cluster to carry out workload operations.

19. The system of claim 15, wherein workload communications from the management application to the satellite container are initiated by the satellite container, and wherein workload communications from the satellite container to the management application are also initiated by the satellite container.

20. The system of claim 19, wherein the workload communications include at least the workload data, and wherein the workload data includes at least the workload commands to manage the customer computer cluster and data from at least one of the plurality of third-party compute systems.

* * * * *